United States Patent
Schmidt

(10) Patent No.: US 12,502,638 B2
(45) Date of Patent: Dec. 23, 2025

(54) PROCESS AND PLANT FOR REMOVING CARBON DIOXIDE FROM SYNTHESIS GAS

(71) Applicant: L'Air Liquide, Société Anonyme pour l'Etude et l'Exploitation des Procédés Georges Claude, Paris (FR)

(72) Inventor: Sophia Schmidt, Frankfurt am Main (DE)

(73) Assignee: L'Air Liquide, Societe Anonyme Pour l'Etude et l'Exploitation des Procedes Georges Claude, Paris (FR)

( * ) Notice: Subject to any disclaimer, the term of this patent is extended or adjusted under 35 U.S.C. 154(b) by 462 days.

(21) Appl. No.: 18/122,947

(22) Filed: Mar. 17, 2023

(65) Prior Publication Data

US 2023/0321588 A1 Oct. 12, 2023

(30) Foreign Application Priority Data

Mar. 18, 2022 (EP) .................... 22162877

(51) Int. Cl.
| | |
|---|---|
| *B01D 53/14* | (2006.01) |
| *B01D 53/18* | (2006.01) |
| *B01D 53/26* | (2006.01) |
| *C10K 1/00* | (2006.01) |
| *C10K 1/16* | (2006.01) |
| *C10K 3/04* | (2006.01) |

(52) U.S. Cl.
CPC ..... *B01D 53/1475* (2013.01); *B01D 53/1406* (2013.01); *B01D 53/1418* (2013.01); *B01D 53/1425* (2013.01); *B01D 53/18* (2013.01); *B01D 53/265* (2013.01); *C10K 1/005* (2013.01); *C10K 1/16* (2013.01); *C10K 3/04* (2013.01); *B01D 2252/2021* (2013.01); *B01D 2252/20468* (2013.01); *B01D 2256/16* (2013.01); *B01D 2256/20* (2013.01)

(58) Field of Classification Search
CPC ............ B01D 53/1475; B01D 53/1406; B01D 53/1418; B01D 53/1425; B01D 53/18; B01D 53/265; C10K 1/005; C10K 1/16; C10K 3/04

See application file for complete search history.

(56) References Cited

U.S. PATENT DOCUMENTS

| | | | |
|---|---|---|---|
| 4,591,370 A | 5/1986 | Gazzi et al. | |
| 2005/0172807 A1 | 8/2005 | Mak | |
| 2009/0241773 A1* | 10/2009 | Lechnick | C10L 3/10 95/44 |
| 2009/0241779 A1 | 10/2009 | Lechnick et al. | |
| 2010/0111784 A1 | 5/2010 | Mak et al. | |
| 2022/0143546 A1 | 5/2022 | Schmidt et al. | |
| 2022/0144634 A1 | 5/2022 | Schmidt et al. | |

FOREIGN PATENT DOCUMENTS

| | | |
|---|---|---|
| DE | 199 45 326 | 8/2000 |
| EP | 4 000 713 | 5/2022 |
| EP | 4 000 714 | 5/2022 |
| WO | WO 2012 121727 | 9/2012 |

OTHER PUBLICATIONS

European Search Report for corresponding EP 22162877.9, Aug. 19, 2022.

* cited by examiner

*Primary Examiner* — Yong L Chu
(74) *Attorney, Agent, or Firm* — Elwood L. Haynes

(57) ABSTRACT

The present invention relates to a process for removing carbon dioxide from a synthesis gas having at least hydrogen and carbon dioxide in which the synthesis gas is at least partially freed of carbon dioxide in an absorption apparatus by physical absorption at elevated absorption pressure. The carbon dioxide is subsequently desorbed by pressure reduction relative to the absorption pressure in a plurality of serially arranged flash stages and an at least partially regenerated absorption medium is withdrawn from the last of the plurality of serially arranged flash stages, recompressed to absorption pressure and recycled into the absorption apparatus for use as absorption medium. It is also provided according to the invention that a partially regenerated absorption medium from a flash stage upstream of the last of the plurality of serially arranged flash stages is recompressed to absorption pressure and recycled into the absorption apparatus for use as absorption medium.

17 Claims, 2 Drawing Sheets

PROCESS AND PLANT FOR REMOVING CARBON DIOXIDE FROM SYNTHESIS GAS

CROSS REFERENCE TO RELATED APPLICATIONS

This application claims the benefit of priority under 35 U.S.C. § 119 (a) and (b) to European Patent Application No. 22162877.9, filed Mar. 18, 2022, the entire contents of which are incorporated herein by reference.

FIELD OF THE INVENTION

The invention relates to a process for removing carbon dioxide ($CO_2$) from synthesis gas. The invention relates to a plant for removing carbon dioxide ($CO_2$) from synthesis gas.

PRIOR ART

Subsequently published European patent applications EP 20 020 521 and EP 20 020 522 describe a process for producing hydrogen or synthesis gas by providing raw synthesis gas and separating the carbon dioxide occurring in the raw synthesis gas by absorption at elevated pressure in a physical absorption medium, for example methanol. The carbon dioxide-laden absorption medium is treated in a plurality of flash stages connected successively to subsequently desorb the carbon dioxide from the absorption medium as quantitatively as possible and subsequently send it on to a subsequent pressurized storage or a further use.

The process is special inter alia because no hot regeneration of the laden absorption medium is required—the carbon dioxide is thus desorbed from the laden absorption medium exclusively by pressure reduction (flashing). However, carbon dioxide cannot be removed down to trace levels by flashing alone. And yet it is possible to desorb the carbon dioxide from the laden absorption medium virtually quantitatively when the last of the serially arranged flash stage is operated at low pressure to negative pressure (vacuum), as described in EP 20 020 521 and EP 20 020 522. The absorption medium withdrawn from this last flash stage preferably operated at negative pressure must subsequently be recompressed to absorption pressure. The carbon dioxide simultaneously withdrawn from the last flash stage must be compressed to the pressure required for storage or further use. Both operations require the large-scale use of electrical energy for the typically rotating machines (pumps and compressors) that are usually required therefor. Achieving the required carbon dioxide separation rates further requires large amounts of absorption medium. This too leads to a high electricity consumption of the pumps which recompress the absorption medium to absorption pressure. A particularly high proportion of the electricity consumption of the relevant plant is accounted for by the compressor unit which recompresses the desorbed carbon dioxide to atmospheric pressure or a higher pressure.

SUMMARY

It is a general object of the present invention to overcome the abovementioned disadvantages of the prior art.

It is especially an object of the present invention to reduce the electricity consumption and thus the operating costs (OPEX) of the relevant process and the relevant plant.

It is a further object of the present invention to reduce the electricity consumption of the relevant process and the relevant plant without accepting compromises in respect of carbon dioxide absorption in the absorption medium and consumption of coolant for maintaining the required low temperature level.

It is a further object of the present invention to reduce the carbon dioxide amount to be compressed in order thus to reduce the capital costs (CAPEX) for the required compressor unit.

It is a further object of the present invention to reduce the carbon dioxide amount to be compressed without accepting compromises in respect of carbon dioxide absorption in the absorption medium and consumption of coolant for maintaining the required low temperature level.

The independent claims make a contribution to the at least partial achievement of at least one of the above objects. The dependent claims provide preferred embodiments which contribute to the at least partial achievement of at least one of the objects. Preferred embodiments of constituents of one category according to the invention are, where relevant, likewise preferred for identically named or corresponding constituents of a respective other category according to the invention.

The terms "having", "comprising" or "containing", etc., do not preclude the possible presence of further elements, ingredients, etc. The indefinite article "a" does not preclude the possible presence of a plurality.

A general embodiment of the invention is characterized by a process for removing carbon dioxide ($CO_2$) from synthesis gas, wherein the synthesis gas comprises at least hydrogen ($H_2$) and carbon dioxide ($CO_2$), comprising the steps of (a) providing a physical absorption medium, in particular methanol;

(b) supplying the synthesis gas to an absorption apparatus and removing carbon dioxide from the synthesis gas by physical absorption of the carbon dioxide in the absorption medium at absorption pressure in the absorption apparatus, wherein the absorption medium and the synthesis gas are run in countercurrent in the absorption apparatus and wherein an absorption medium laden at least with carbon dioxide and a synthesis gas at least partially freed of carbon dioxide are withdrawn from the absorption apparatus;

(c) removing carbon dioxide from the laden absorption medium withdrawn from the absorption apparatus by desorption of the carbon dioxide in a plurality of serially arranged flash stages by pressure reduction relative to the absorption pressure, wherein the pressure prevailing in a flash stage is reduced from flash stage to flash stage in the flow direction of the absorption medium;

(d) withdrawing an at least partially regenerated absorption medium from the last of the plurality of serially arranged flash stages, recompressing the at least partially regenerated absorption medium to absorption pressure and recycling the at least partially regenerated compressed absorption medium for use as absorption medium in the absorption apparatus according to step (b);

(e) withdrawing a partially regenerated absorption medium from a flash stage upstream of the last of the plurality of serially arranged flash stages, recompressing the partially regenerated absorption medium to absorption pressure and recycling the partially regenerated compressed absorption medium for use as absorption medium in the absorption apparatus according to step (b).

The synthesis gas optionally also comprises carbon monoxide (CO).

According to step (b) a synthesis gas at least partially freed of carbon dioxide is withdrawn from the absorption apparatus. This withdrawn "synthesis gas" may in the context of the present invention also be a gas mixture which comprises hydrogen as the main component and comprises only small amounts of carbon monoxide, if any.

According to the invention step (e) comprises withdrawing a partially regenerated absorption medium from a flash stage upstream of the last of the plurality of serially arranged flash stages. Furthermore, according to the invention, the partially regenerated absorption medium is recompressed to absorption pressure and the recompressed partially regenerated absorption medium is recycled to the absorption apparatus for reuse as absorption medium. A portion of the laden absorption medium which is only partially regenerated is accordingly not sent to the last flash stage but rather utilized for absorption of carbon dioxide in the absorption apparatus.

It has surprisingly been found that in contrast to a process mode without partial recycling of the partially regenerated absorption medium the process mode according to the invention can achieve significant energy savings. These energy savings are primarily achieved in respect of electricity consumption but also in respect of the energy input for cooling the absorption medium. The use of coolant is further reduced. Since the energy input for recompressing the carbon dioxide is altogether reduced, savings in respect of capital costs for compressors can also be achieved.

The at least partially regenerated absorption medium withdrawn according to step (d) necessarily has a lower carbon dioxide concentration than the partially regenerated absorption medium withdrawn according to step (e). The carbon dioxide concentration is to be understood as meaning the amount of carbon dioxide physically bonded to the absorption medium or dissolved therein, for example in mol of $CO_2$ per liter of absorption medium.

The absorption medium is preferably methanol. Step (a) therefore preferably comprises providing methanol as the physical absorption medium. The carbon dioxide is preferably absorbed in methanol at low temperatures, in particular cryogenic temperatures, in the absorption apparatus. The methanol preferably has a temperature of less than $-10°$ C. or of less than $-20°$ C. or of less than $-30°$ C. or of less than $-40°$ C. before entry into the absorption apparatus. The methanol preferably has a temperature of more than $-60°$ C. or of more than $-50°$ C. before entry into the absorption apparatus.

The absorption apparatus is for example configured as an absorption column and is operated at absorption pressure. Absorption pressure is elevated pressure, in particular a pressure markedly above ambient pressure, in particular a pressure of more than 20 bar or more than 30 bar, for example from 20 to 80 bar, preferably 30 to 70 bar, more preferably 35 to 55 bar, more preferably 35 to 45 bar.

Step (c) comprises desorbing carbon dioxide from the absorption medium again by pressure reduction relative to the absorption pressure in a plurality of serially arranged flash stages. The flash stages are serially arranged and configured for example as flash columns or flash vessels. "Serially arranged" is to be understood as meaning in particular that the plurality of flash stages are connected successively and are in fluid communication with one another, in particular two immediately successive flash stages are in fluid communication. The pressure in a flash stage is lower than the absorption pressure and is reduced from flash stage to flash stage in the flow direction of the absorption medium. The pressure in a downstream flash stage is thus in principle lower than the pressure in the flash stage upstream of this flash stage.

Step (e) comprises withdrawing a partially regenerated absorption medium from a flash stage upstream of the last of the plurality of serially arranged flash stages. If the process according to the invention comprises a total of four flash stages for example, the partially regenerated absorption medium may be withdrawn from the first, second and/or third flash stage. Step (e) may thus comprise withdrawing the partially regenerated absorption medium from a plurality of flash stages upstream of the last of the plurality of serially arranged flash stages. The partially regenerated absorption medium is preferably not withdrawn from the first of the plurality of serially arranged flash stages. The partially regenerated absorption medium is preferably withdrawn from a flash stage immediately upstream of the last of the plurality of serially arranged flash stages. If the process according to the invention comprises four flash stages for example, step (e) preferably comprises withdrawing the partially regenerated absorption medium from the third flash stage. If the process according to the invention comprises three flash stages for example, step (e) preferably comprises withdrawing the partially regenerated absorption medium from the second flash stage.

The at least partially regenerated absorption medium according to step (d) which is withdrawn from the last of the plurality of serially arranged flash stages is either partially regenerated or completely regenerated. In the present context "completely regenerated" is to be understood as meaning that the absorption medium is no longer laden or only insignificantly laden with carbon dioxide. In one example such a completely regenerated absorption medium has a carbon dioxide concentration of 0% to 2% relative to a carbon dioxide concentration originally achieved in the absorption medium in the absorption apparatus. The absorption medium partially regenerated according to step (e) accordingly has a higher carbon dioxide concentration than the absorption medium at least partially regenerated according to step (d). In one example an absorption medium partially regenerated according to step (e) has a carbon dioxide concentration of 3% to 10% relative to a carbon dioxide concentration originally achieved in the absorption medium in the absorption apparatus.

The synthesis gas supplied to the absorption apparatus is produced by processes known to those skilled in the art. Examples include steam reforming (SMR), autothermal reforming (ATR), gas heated reforming (GHR) and combinations of the aforementioned. These processes produce a synthesis gas which comprises at least the constituents hydrogen ($H_2$), carbon monoxide (CO) and carbon dioxide ($CO_2$). The process for synthesis gas production is preferably autothermal reforming. Autothermal reforming is generally chosen for producing synthesis gas when particularly high gas capacities are required. In such cases the removal of the carbon dioxide by physical absorption is often economically more advantageous than a process for chemical absorption of the carbon dioxide, for example an amine scrubbing. The primarily produced synthesis gas is preferably subjected to a water gas shift reaction in a subsequent step to increase the yield of hydrogen. By converting the carbon monoxide to carbon dioxide in the course of the water gas shift reaction the synthesis gas supplied to the absorption apparatus contains hydrogen and carbon dioxide as its main components. As a result of separating the carbon dioxide from the synthesis gas in the course of the process according to the invention, step (a) in this case preferably comprises withdrawing from the absorption apparatus a synthesis gas which comprises hydrogen as its main constituent. This raw hydrogen product may be supplied for example to a pressure swing adsorption process (PSA) for further workup to obtain pure hydrogen.

One embodiment of the process according to the invention is characterized in that the proportion of the partially regenerated absorption medium which according to step (e) is withdrawn and recycled to step (b) is 10% to 50% of the total amount of the absorption medium used in the process, preferably 20% to 40% of the total amount of the absorption medium used in the process.

One embodiment of the process according to the invention is characterized in that the pressure prevailing in the last of the plurality of serially arranged flash stages corresponds to negative pressure.

The last of the serially arranged flash stages is preferably operated at negative pressure (vacuum). In one example the last of the serially arranged flash stages is at a pressure of 0.1 to 0.9 bar, preferably of 0.1 to 0.5 bar, more preferably of 0.2 bar. "Negative pressure" is to be understood as meaning a pressure lower than ambient pressure. The use of negative pressure in the last flash stage maximizes the yield of desorbed carbon dioxide and maximizes the capacity of the at least partially regenerated absorption medium for reabsorption of carbon dioxide into the absorption apparatus.

In a further embodiment of the process according to the invention the pressure in the last of the plurality of serially arranged flash stages corresponds to negative pressure and the pressure in the flash stage immediately upstream of this last flash stage corresponds to negative pressure. If the last two flash stages are operated at negative pressure this additionally saves energy in the recompression of the carbon dioxide for the same amount of separated carbon dioxide, as has been demonstrated by corresponding simulations.

One embodiment of the process according to the invention is characterized in that carbon dioxide desorbed in the last flash stage of the plurality of serially arranged flash stages is withdrawn from said last flash stage and compressed to the pressure corresponding to the pressure of the flash stage immediately upstream of said last flash stage and in that the carbon dioxide withdrawn from the last flash stage and compressed is supplied to the flash stage immediately upstream of said last flash stage.

In the present context "compressed to the pressure corresponding to the pressure of the flash stage immediately upstream of said flash stage" is to be understood as meaning that the carbon dioxide is compressed to a pressure which corresponds substantially or precisely to the pressure in the immediately upstream flash stage. The carbon dioxide is especially compressed to a pressure corresponding to the pressure in the immediately upstream flash stage ±10% or ±5% or ±3%.

The last of the flash stages arranged in series is preferably a flash stage in which the pressure in this flash stage corresponds to negative pressure. It is accordingly possible to connect the suction side of a vacuum compressor to this flash stage to generate negative pressure in this flash stage. The pressure side of the vacuum compressor is connected to the flash stage immediately upstream of this last flash stage. The pressure on the pressure side of the vacuum compressor then corresponds to the pressure or corresponds substantially to the pressure in this upstream flash stage. This results in simplified interconnection of the individual apparatuses in the process according to the invention. Furthermore, the carbon dioxide on the pressure side of the vacuum compressor is compressed only to the minimum required pressure, thus minimizing the demand for compression energy.

One embodiment of the process according to the invention is characterized in that the prevailing pressure in the flash stage immediately upstream of the last flash stage corresponds to ambient pressure or a pressure lower than the absorption pressure and in that carbon dioxide desorbed in said flash stage is withdrawn from this flash stage and subjected to a further use as a carbon dioxide product. It is preferable when the flash stage immediately upstream of the last flash stage is not the first of the serially arranged flash stages. It is preferably the second flash stage in the case of a total number of three serially arranged flash stages.

It is preferable when the flash stage immediately upstream of the last flash stage is a flash stage where ambient pressure or moderate positive pressure prevails. Such a flash stage is also referred to as a low pressure flash stage. It is preferable when such a low pressure flash stage has a pressure of 1 to 5 bar, preferably of 1 to 3 bar, more preferably of 1 to 2 bar, more preferably of 1.1 to 1.7 bar, more preferably of 1.5 bar.

Depending on the pressure prevailing in the flash stage immediately upstream of the last flash stage the carbon dioxide withdrawn from this flash stage may be sent directly to a further use or storage. The further use or storage may optionally require an additional compression step, in particular when this flash stage is a low pressure flash stage.

One embodiment of the process according to the invention is characterized in that value gas coabsorbed in the absorption apparatus, in particular hydrogen, is desorbed in the first flash stage of the plurality of serially arranged flash stages and the value gas is withdrawn from this first flash stage and recompressed to absorption pressure and the recompressed value gas is supplied to the synthesis gas.

This measure maximizes the yield of synthesis gas freed of carbon dioxide which is withdrawn from the absorption apparatus according to step (a). The synthesis gas freed of carbon dioxide is preferably a raw hydrogen product.

The first flash stage of the plurality of serially arranged flash stage is preferably an intermediate pressure flash stage. An intermediate pressure flash stage is operated for example at a pressure of 10 to 25 bar, preferably 12 to 20 bar, particularly preferably 15 bar. These pressure ranges ensure that essentially hydrogen is desorbed in the first flash stage and carbon dioxide remains selectively physically bonded to the absorption medium.

An intermediate flash stage is alternatively a flash stage operated at a pressure of 5 to 12 bar, preferably 6 to 10 bar, particularly preferably 8 bar.

One embodiment of the process according to the invention is characterized in that the plurality of serially arranged flash stages comprises at least three flash stages. The plurality of serially arranged flash stages preferably comprises three flash stages. Alternatively and preferably the plurality of serially arranged flash stages comprises four flash stages.

If the plurality of serially arranged flash stages comprises three flash stages, in the flow direction of the absorption medium the three flash stages are preferably configured as an intermediate pressure flash stage, a low pressure flash stage and a negative pressure flash stage. The intermediate pressure flash stage preferably has a pressure of 10 to 25 bar, more preferably a pressure of 12 to 20 bar, more preferably of 15 bar. The low pressure flash stage preferably has a pressure of 1 to 5 bar, more preferably of 1 to 3 bar, more preferably of 1 to 2 bar, more preferably of 1.1 to 1.7 bar, more preferably of 1.5 bar. The negative pressure flash stage preferably has a pressure of 0.1 to 0.9 bar, more preferably of 0.1 to 0.5 bar, more preferably of 0.2 bar.

If the plurality of serially arranged flash stages comprises four flash stages, in the flow direction of the absorption medium the four flash stages are preferably configured as a first intermediate pressure flash stage, a second intermediate pressure flash stage, a low pressure flash stage and a negative pressure flash stage. The first intermediate pressure flash stage preferably has a pressure of 10 to 25 bar, more preferably of 12 to 20 bar, more preferably of 15 bar. The second intermediate flash stage preferably has a pressure of 5 to 12 bar, more preferably of 6 to 10 bar, more preferably of 8 bar. The low pressure flash stage preferably has a pressure of 1 to 5 bar, more preferably of 1 to 3 bar, more preferably of 1 to 2 bar, more preferably of 1.1 to 1.7 bar, more preferably of 1.5 bar. The negative pressure flash stage preferably has a pressure of 0.1 to 0.9 bar, more preferably of 0.1 to 0.5 bar, more preferably of 0.2 bar.

One embodiment of the process according to the invention is characterized in that in the gas flow direction of the synthesis gas the absorption apparatus comprises a plurality of serially arranged absorption stages, wherein the at least partially regenerated absorption medium withdrawn according to step (d) is supplied to one of the absorption stages and wherein the partially regenerated absorption medium withdrawn according to step (e) is supplied to an absorption stage upstream of the aforementioned absorption stage.

Impurities often present in the synthesis gas, for example hydrogen cyanide or other acid gases, exhibit a higher absorption coefficient than carbon dioxide in respect of many absorption media, in particular methanol. The above measure ensures that the at least partially regenerated absorption medium withdrawn according to step (d), which has a lower carbon dioxide concentration than the at least partially regenerated absorption medium according to step (e), is in the downstream absorption stage contacted with a synthesis gas stream which preferably comprises exclusively carbon dioxide as the constituent to be removed. This improves the selectivity of the absorption process and the purity of the synthesis gas withdrawn from the absorption apparatus according to step (a) which contains predominantly hydrogen.

It is thus preferable when the absorption stage to which the at least partially regenerated absorption medium withdrawn from step (d) is supplied is the last absorption stage of the serially arranged absorption stages of the absorption apparatus.

One embodiment of the process according to the invention is characterized in that the process comprises no hot regeneration step for regenerating the laden absorption medium.

As mentioned above the process according to the invention has the feature that exclusively pressure reduction (flashing) relative to the absorption pressure is used for desorption of the carbon dioxide. In particular the process according to the invention requires no hot regeneration step where the absorption medium is heated to boiling point such as is usually used in gas scrubs for complete regeneration of the absorption medium. In such a hot regeneration step the absorption medium vapours act as a stripping medium.

One embodiment of the process according to the invention is characterized in that the process requires no stripping auxiliary for regenerating the laden absorption medium.

A process mode without stripping auxiliaries for quantitative desorption of the carbon dioxide from the absorption medium is possible especially when the last of the serially arranged flash stages is operated at negative pressure (vacuum). Gas scrubbing processes often employ nitrogen as a stripping auxiliary in the flash stages. However, this would result in contamination of the carbon dioxide product and necessitate a downstream gas separation.

Advantages and effects described for aforementioned process features of the invention apply equally to the plant features which follow, at least for technically equivalent apparatus features.

A general embodiment of the invention is characterized by a plant for removing carbon dioxide ($CO_2$) from synthesis gas, wherein the synthesis gas comprises at least hydrogen ($H_2$) and carbon dioxide ($CO_2$), comprising the following plant components in operative connection with one another:

(a) means for providing a physical absorption medium, in particular methanol;

(b) an absorption apparatus and means for supplying the synthesis gas to the absorption apparatus, wherein the absorption apparatus is configured such that the carbon dioxide is removable from the synthesis gas by physical absorption in the absorption medium at absorption pressure and the absorption apparatus is configured such that the absorption medium and the synthesis gas may be run in countercurrent in the absorption apparatus and wherein the absorption apparatus is further configured such that an absorption medium laden at least with carbon dioxide and a synthesis gas at least partially freed of carbon dioxide are withdrawable from the absorption apparatus;

(c) means for removing carbon dioxide from the laden absorption medium withdrawable from the absorption apparatus by desorption, wherein the means comprise at least a plurality of serially arranged flash stages, wherein said flash stages are configured such that a pressure reduction relative to the absorption pressure may be carried out therein and the flash stages are further configured such that the pressure prevailing in a flash stage can decrease from flash stage to flash stage in the flow direction of the medium;

(d) means for withdrawing an at least partially regenerated absorption medium from the last of the plurality of serially arranged flash stages, means for recompressing the at least partially regenerated absorption medium to absorption pressure and means for recycling the at least partially regenerated compressed absorption medium for use as absorption medium in the absorption apparatus according to (b);

(e) means for withdrawing a partially regenerated absorption medium from a flash stage upstream of the last of the plurality of serially arranged flash stages, means for recompressing the partially regenerated absorption medium to absorption pressure and means for recycling the partially regenerated compressed absorption medium for use as absorption medium in the absorption apparatus according to (b).

One embodiment of the plant according to the invention is characterized in that the plant comprises means for generating negative pressure in the last of the plurality of serially arranged flash stages.

One embodiment of the plant according to the invention is characterized in that the plant comprises means for withdrawing and compressing carbon dioxide desorbable in the last flash stage of the plurality of serially arranged flash stages, wherein the means for compressing are configured such that the pressure to which the desorbable carbon dioxide is compressible corresponds to the pressure of the flash stage immediately upstream of said last flash stage and wherein the plant comprises means for supplying the carbon dioxide that may be withdrawn from the last flash stage and compressed to the flash stage immediately upstream of the last flash stage of the plurality of serially arranged flash stages.

One embodiment of the plant according to the invention is characterized in that in the gas flow direction of the synthesis gas the absorption apparatus comprises a plurality of serially arranged absorption stages, wherein the plant comprises means such that the at least partially regenerated absorption medium withdrawn according to (d) is suppliable to one of the absorption stages and the plant comprises means such that the partially regenerated absorption medium withdrawn according to (e) is suppliable to an absorption stage upstream of the aforementioned absorption stage.

One embodiment of the process according to the invention is characterized in that the plant comprises no means for hot regeneration of the laden absorption medium.

One embodiment of the plant according to the invention is characterized in that the plant comprises no means for providing a stripping auxiliary for use in the flash stages.

At least one of the objects of the invention is further at least partially solved by a use of the inventive process according to at least one embodiment or by a use of the inventive plant according to at least one embodiment for producing a hydrogen product for use as fuel having a hydrogen content of at least 95 mol % and a carbon dioxide content of less than 1 mol %. It is preferable when the use of the process according to the invention or the plant according to the invention is for producing a hydrogen product for use as fuel having a hydrogen content of at least 98 mol % or at least 99 mol % and a carbon dioxide content of less than 0.5 mol % or less than 0.1 mol %.

BRIEF DESCRIPTION OF THE DRAWINGS

For a further understanding of the nature and objects for the present invention, reference should be made to the following detailed description, taken in conjunction with the accompanying drawings, in which like elements are given the same or analogous reference numbers and wherein:

In FIGS. 1 and 2 identical elements are provided with identical reference numerals.

DETAILED DESCRIPTION OF PREFERRED EMBODIMENTS

Figure 1:
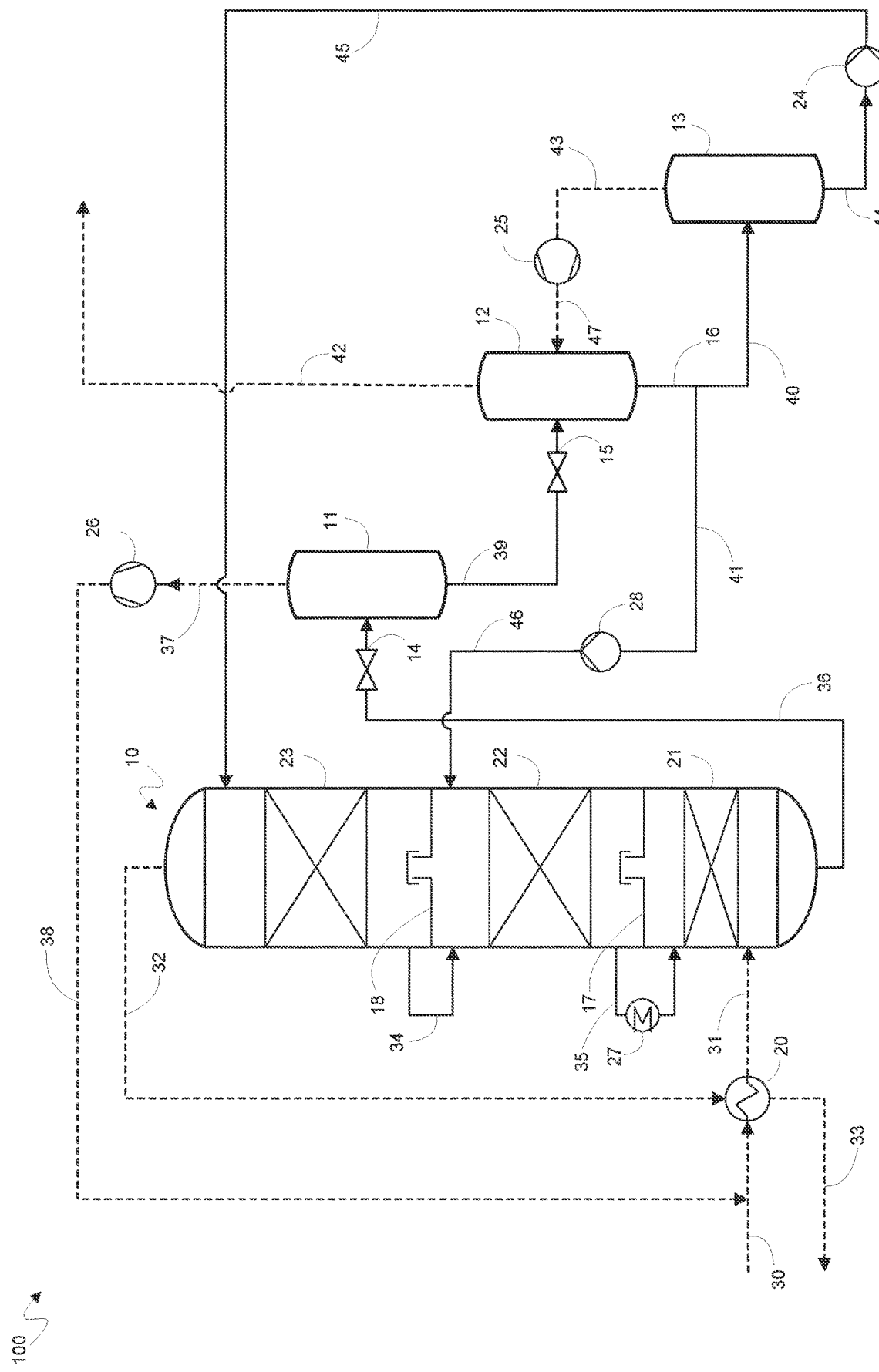
FIG. 1 is a block flow diagram of a process corresponding to a possible embodiment of the invention.

FIG. 1 shows a highly simplified block flow diagram of a process 100 corresponding to a possible embodiment of the invention. The absorption medium is methanol. Gas streams are represented by dashed lines while liquid streams are represented by solid lines. The flow direction of a stream is indicated by arrows.

Synthesis gas from a water gas shift reactor (not shown) comprising hydrogen ($H_2$) and carbon dioxide ($CO_2$) as main constituents is supplied via a conduit 30 at a pressure of 38 bar and a temperature of about 40° C. and initially cooled to a temperature of about −10° C. against cold synthesis gas from conduit 32 in heat exchanger 20. The synthesis gas cooled to this temperature is sent on via conduit 31 and subsequently enters a lower region of an absorption apparatus 10 in the form of an absorption column. The absorption apparatus 10 is operated at an absorption pressure of 38 bar and comprises three absorption stages 21, 22 and 23 connected successively in the gas flow direction. The synthesis gas initially enters the first absorption stage 21. The first absorption stage 21 serves for a first removal of carbon dioxide from the synthesis gas and the further cooling of the synthesis gas with cryogenic methanol. This passes via conduit 17 from the second absorption stage arranged thereabove into the first absorption stage 21 and is cooled in conduit 17 by a refrigerant evaporator-heat exchanger 27. The prepurified synthesis gas passes through the chimney tray 17 and enters the second absorption stage 22 in which the majority of the carbon dioxide is removed from the synthesis gas. The second absorption stage 22 is supplied with a cryogenic methanol stream (cooling apparatuses not shown) from conduit 46 which has a carbon dioxide residual loading of about 5 mol % (concentration of carbon dioxide in methanol) and a temperature of about −39° C. In addition, the second absorption stage 22 may (optionally) be supplied with a cryogenic methanol from the third absorption stage 23 via conduit 34. The synthesis gas freed of carbon dioxide subsequently enters the third absorption stage 23 via the chimney tray 18. This stage effects the fine purification of the synthesis gas, i.e. said gas is largely freed of any remaining residual amounts of carbon dioxide down to trace levels. The third absorption stage 23 is supplied with cryogenic methanol from conduit 45 (cooling apparatuses not shown) which has a carbon dioxide residual loading of about 1 mol % (concentration of carbon dioxide in methanol) and a temperature of about −48° C.

The synthesis gas practically completely freed of carbon dioxide which comprises hydrogen as the remaining main component is subsequently withdrawn from the absorption apparatus 10 via conduit 32 and heated upon passing through the heat exchanger 20. The heated synthesis gas is subsequently sent on via conduit 33 and may be utilized for example as untreated hydrogen product in the context of a low-carbon dioxide fuel for heating (so-called "fuel grade" hydrogen). Workup in a subsequent purification step is also possible, for example with the aid of a pressure swing adsorption (not shown) to obtain a pure hydrogen product.

Laden methanol is withdrawn from the bottom region of the absorption apparatus 10 via conduit 36 and after decompression to about 15 bar enters into an intermediate pressure flash stage 11 via decompression valve 14. The intermediate pressure flash stage 11 is in the form of a flash column and serves primarily for desorption of carbon dioxide rather than desorption of value gases coabsorbed in the absorption apparatus 10, in particular coabsorbed hydrogen. Desorbed hydrogen and optionally further gases are withdrawn from the intermediate pressure flash stage via conduit 37 and via a recycle gas compressor 26 recompressed to the absorption pressure of 38 bar. The hydrogen desorbed and compressed in the intermediate pressure flash stage 11 is subsequently supplied to the synthesis gas main stream in conduit 30.

The methanol still laden with the majority of the carbon dioxide is withdrawn from the intermediate pressure flash stage via conduit 39 and after decompression to about 1.5 bar passes via decompression valve 15 into the low pressure flash stage 12 which is likewise in the form of a flash column. The pressure reduction to 1.5 bar desorbs the majority of carbon dioxide from the methanol absorption medium. The discharged carbon dioxide is withdrawn from the low pressure flash stage 12 via conduit 42. After reducing the pressure to about 1.5 bar the absorption medium (methanol) retains a residual loading of about 5 mol % (concentration of carbon dioxide in methanol) (conduit 36). This partially regenerated methanol is withdrawn from the low pressure flash stage via conduit 16 and subsequently divided over conduits 41 and 40. A first substream of the partially regenerated methanol is supplied to the second absorption stage 22 via conduits 41 and 46. Arranged between the conduits 41 and 46 is an absorption medium pump which recompresses the partially regenerated methanol to the absorption pressure of 38 bar. The remaining substream of the partially regenerated methanol is as a second substream supplied via conduit 40 to the negative pressure flash stage 13, which is likewise in the form of a flash column. The proportion of the first substream in the total stream of methanol circulated in the plant is about 30%.

The negative pressure flash stage 13 is operated at a pressure of 0.2 bar. This vacuum is generated by a vacuum compressor 25. The vacuum compressor 25 is arranged between the conduits 47 and 43. Accordingly, the suction side of the vacuum compressor 25 is connected to the negative pressure flash stage 13 via conduit 43. Applying negative pressure in the negative pressure flash stage 13 further reduces the carbon dioxide concentration in the laden methanol of the second substream to 1 mol % (concentration of carbon dioxide in methanol). The carbon dioxide thus expelled is withdrawn from the negative pressure flash stage via conduit 43 and is compressed to a pressure of 1.5 bar via vacuum compressor 25. The pressure side of the vacuum compressor 25 is via conduit 47 connected to the low pressure flash stage 12 in which a pressure of 1.5 bar accordingly prevails. The carbon dioxide expelled in the negative pressure flash stage 13 together with the carbon dioxide expelled in the negative pressure flash stage 12 exits the latter via conduit 42. The carbon dioxide product thus generated in conduit 42 is subsequently sent either for storage or for further use (not shown), optionally after a further compression.

The methanol largely regenerated by flashing at negative pressure (loading of carbon dioxide about 1 mol % carbon dioxide in methanol) is withdrawn from the negative pressure flash stage 13 via conduit 44 and recompressed to the absorption pressure of 38 bar using absorption medium pump 24. The compressed largely regenerated methanol is sent on via conduit 45 and subsequently enters the third absorption stage 23 of the absorption apparatus 10 in which it is used for fine purification of the ascending synthesis gas stream as described above.

Figure 2:
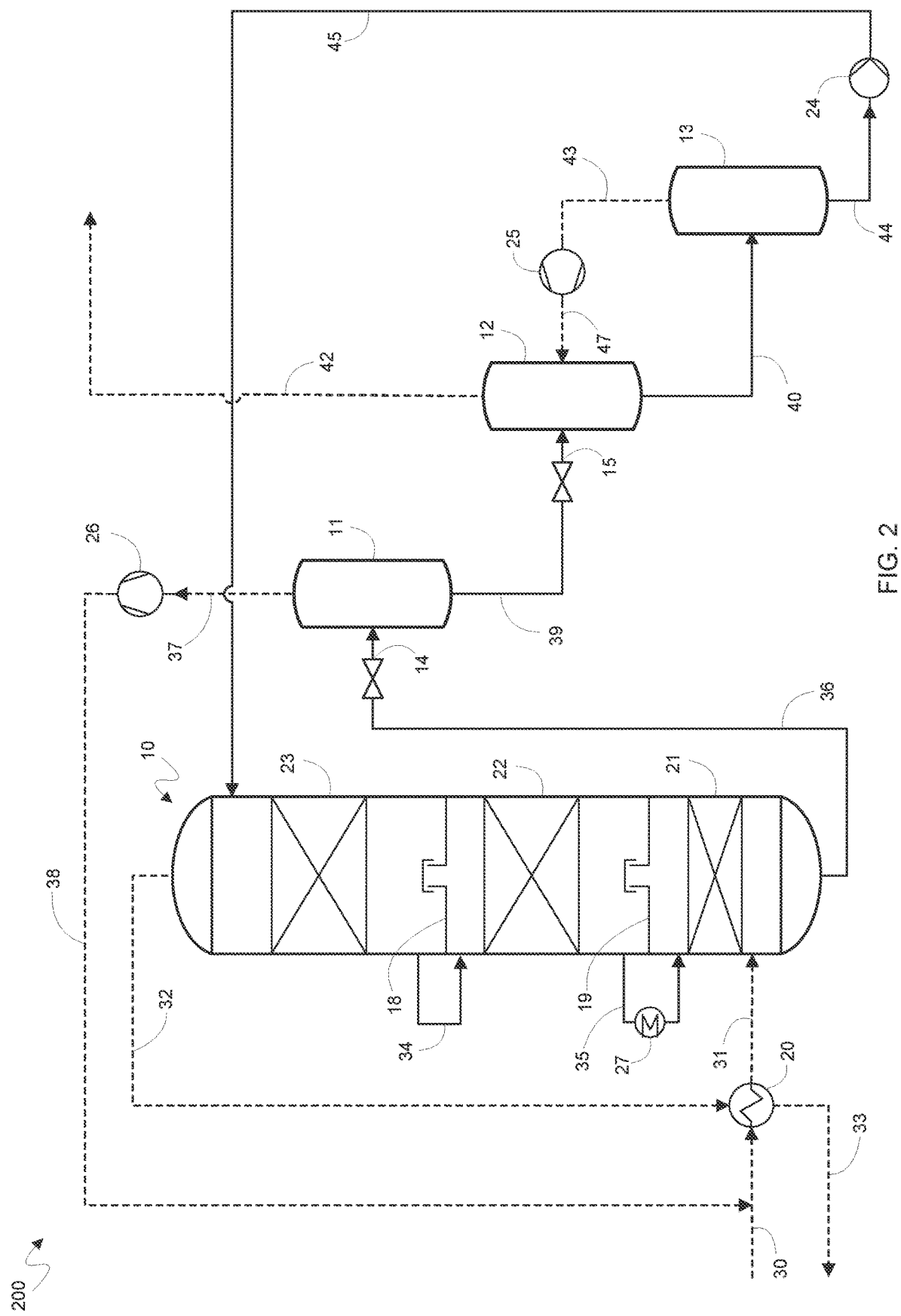
FIG. 2 shows a process as a comparative example.

FIG. 2 shows a process 200 as a comparative example without inventive recycling of the partially regenerated methanol from the low pressure flash stage 12. In other words the total amount of the methanol regenerated in the negative pressure flash stage 13 is recycled to the absorption apparatus 10. Since the second absorption stage 22 is accordingly not directly supplied with partially regenerated methanol from the low pressure flash stage 12, supply of the second absorption stage 22 with partially laden methanol from the third absorption stage 23 via conduit 34 is obligatory here.

The following table demonstrates the advantages of the process according to the invention and the plant according to the invention with inventive absorption medium recycling according to step (e) or plant component (e) with reference to a numerical example. The reported values are based on the simulation performed using Aspen Plus® software from AspenTech.

|  |  | FIG. 1, process 100 (invention) | FIG. 2, process 200 |
|---|---|---|---|
| Carbon dioxide separated | % | 97.8 | 97.8 |
| Electrical power | MW | 6.8 | 8.1 |
| Refrigerant evaporator power | MW | 11.5 | 11.6 |
| Cooling water mass flow | t/hr | 23.5 | 24.2 |
| Flow rate of conduits 44-45 | kmol/hr | 43613 | 58930 |
| Flow rate of conduit 41-46 | kmol/hr | 18691 | n/a |
| Vacuum Compressor power | MW | 3.0 | 4.3 |

In the above example, 18 691 kmol/hr of absorption medium from the low pressure flash stage 12 was recycled via conduits 41 and 46 to the second absorption stage 22. This corresponds to a proportion of 30% of the absorption medium total stream. As is apparent from the table the inventive absorption medium recycling (FIG. 1, process 100) results in a surprisingly high saving in the electrical power necessary for the process while the amount of carbon dioxide separated, i.e. initially absorbed and subsequently liberated as carbon dioxide product, remains the same. The process savings in electrical power amount to 16% relative to the same process without absorption medium recycling (FIG. 2, process 200). It was additionally and surprisingly found that the power required for thermal cooling falls by about 0.9%. This appears small at first glance but is significant in respect of an industrial scale process. Accordingly, a smaller mass flow of coolant is necessary to achieve comparable low temperature levels in respect of the absorption medium. In respect of the overall process the operating costs (OPEX) of the process 100 according to FIG. 1 fall by about 9% relative to the process 200 according to FIG. 2 (not shown in the table). Since the power required for the vacuum compressor 25 is about 30% lower for the inventive example it is also possible to make a saving in terms of capital costs (CAPEX) in the case of this apparatus.

LIST OF REFERENCE SYMBOLS

100, 200 Process
10 Absorption apparatus
11 Intermediate pressure flash stage
12 Low pressure flash stage
13 Negative pressure flash stage
14, 15 Decompression valve
17 First chimney tray
18 Second chimney tray
19 Chimney tray
20 Heat exchanger
21 First absorption stage
22 Second absorption stage
23 Third absorption stage
24 Absorption medium pump
25 Vacuum compressor
26 Recycle gas compressor
27 Refrigerant evaporator-heat exchanger
28 Absorption medium pump
16, 30-47 Conduit It will be understood that many additional changes in the details, materials, steps and arrangement of parts, which have been herein described in order to explain the nature of the invention, may be made by those skilled in the art within the principle and scope of the invention as expressed in the

What is claimed is:

1. A process for removing carbon dioxide from synthesis gas, wherein the synthesis gas comprises at least hydrogen and carbon dioxide, comprising the steps of
   (a) providing a physical absorption medium;
   (b) supplying the synthesis gas to an absorption apparatus and removing carbon dioxide from the synthesis gas by physical absorption of the carbon dioxide in the absorption medium at absorption pressure in the absorption apparatus, wherein the absorption medium and the synthesis gas are run in countercurrent in the absorption apparatus and wherein an absorption medium laden at least with carbon dioxide and a synthesis gas at least partially freed of carbon dioxide are withdrawn from the absorption apparatus;
   (c) removing carbon dioxide from the laden absorption medium withdrawn from the absorption apparatus by desorption of the carbon dioxide in a plurality of serially arranged flash stages by pressure reduction relative to the absorption pressure, wherein the pressure prevailing in a flash stage is reduced from flash stage to flash stage in the flow direction of the absorption medium;
   (d) withdrawing an at least partially regenerated absorption medium from the last of the plurality of serially arranged flash stages, recompressing the at least partially regenerated absorption medium to absorption pressure and recycling the at least partially regenerated compressed absorption medium for use as absorption medium in the absorption apparatus according to step (b);
   (e) withdrawing a partially regenerated absorption medium from a flash stage upstream of the last of the plurality of serially arranged flash stages, recompressing the partially regenerated absorption medium to absorption pressure and recycling the partially regenerated compressed absorption medium for use as absorption medium in the absorption apparatus according to step (b).

2. The process according to claim 1, wherein the proportion of the partially regenerated absorption medium which according to step (e) is withdrawn and recycled to step (b) is 10% to 50% of the total amount of the absorption medium used in the process.

3. The process according to claim 1, wherein the pressure prevailing in the last of the plurality of serially arranged flash stages corresponds to negative pressure.

4. The process according to claim 1, wherein carbon dioxide desorbed in the last flash stage of the plurality of serially arranged flash stages is withdrawn from said last flash stage and compressed to the pressure corresponding to the pressure of the flash stage immediately upstream of said last flash stage and in that the carbon dioxide withdrawn from the last flash stage and compressed is supplied to the flash stage immediately upstream of said last flash stage.

5. The process according to claim 3, wherein the prevailing pressure in the flash stage immediately upstream of the last flash stage corresponds to ambient pressure or a pressure lower than the absorption pressure and in that carbon dioxide desorbed in said flash stage is withdrawn from this flash stage and subjected to a further use as a carbon dioxide product.

6. The process according to claim 1, wherein value gas coabsorbed in the absorption apparatus is desorbed in the first flash stage of the plurality of serially arranged flash stages and the value gas is withdrawn from this first flash stage and recompressed to absorption pressure and the recompressed value gas is supplied to the synthesis gas.

7. The process according to claim 1, wherein the plurality of serially arranged flash stages comprises at least three flash stages.

8. The process according to claim 1, wherein the gas flow direction of the synthesis gas the absorption apparatus comprises a plurality of serially arranged absorption stages, wherein the at least partially regenerated absorption medium withdrawn according to step (d) is supplied to one of the absorption stages and wherein the partially regenerated absorption medium withdrawn according to step (e) is supplied to an absorption stage upstream of the aforementioned absorption stage.

9. The process according to claim 7, wherein the absorption stage to which the at least partially regenerated absorption medium withdrawn from step (d) is supplied is the last absorption stage of the serially arranged absorption stages of the absorption apparatus.

10. The process according claim 1, wherein the process comprises no hot regeneration step for regenerating the laden absorption medium.

11. The process according to claim 1, wherein the process requires no stripping auxiliary for regenerating the laden absorption medium.

12. A plant for removing carbon dioxide from synthesis gas, wherein the synthesis gas comprises at least hydrogen and carbon dioxide, comprising the following plant components in operative connection with one another:
   (a) a means for providing a physical absorption medium;
   (b) an absorption apparatus and a means for supplying the synthesis gas to the absorption apparatus, wherein the absorption apparatus is configured such that the carbon dioxide is removable from the synthesis gas by physical absorption in the absorption medium at absorption pressure and the absorption apparatus is configured such that the absorption medium and the synthesis gas may be run in countercurrent in the absorption apparatus and wherein the absorption apparatus is further configured such that an absorption medium laden at least with carbon dioxide and a synthesis gas at least partially freed of carbon dioxide are withdrawable from the absorption apparatus;
   (c) a means for removing carbon dioxide from the laden absorption medium withdrawable from the absorption apparatus by desorption, wherein the means comprise at least a plurality of serially arranged flash stages, wherein said flash stages are configured such that a pressure reduction relative to the absorption pressure may be carried out therein and the flash stages are further configured such that the pressure prevailing in a flash stage can decrease from flash stage to flash stage in the flow direction of the medium;
   (d) a means for withdrawing an at least partially regenerated absorption medium from the last of the plurality of serially arranged flash stages, a means for recompressing the at least partially regenerated absorption medium to absorption pressure and means for recycling the at least partially regenerated compressed absorption medium for use as absorption medium in the absorption apparatus according to (b);
   (e) a means for withdrawing a partially regenerated absorption medium from a flash stage upstream of the last of the plurality of serially arranged flash stages, means for recompressing the partially regenerated absorption medium to absorption pressure and a means for recycling the partially regenerated compressed absorption medium for use as absorption medium in the absorption apparatus according to (b).

13. The plant according to claim 12, further comprising a means for generating negative pressure in the last of the plurality of serially arranged flash stages.

14. The plant according to claim 12, further comprising a means for withdrawing and compressing carbon dioxide desorbable in the last flash stage of the plurality of serially arranged flash stages, wherein the means for compressing are configured such that the pressure to which the desorbable carbon dioxide is compressible corresponds to the pressure of the flash stage immediately upstream of said last flash stage and wherein the plant comprises means for supplying the carbon dioxide that may be withdrawn from the last flash stage and compressed to the flash stage immediately upstream of the last flash stage of the plurality of serially arranged flash stages.

15. The plant according to claim 12, wherein the gas flow direction of the synthesis gas the absorption apparatus comprises a plurality of serially arranged absorption stages, wherein the plant comprises means such that the at least partially regenerated absorption medium withdrawn according to (d) is suppliable to one of the absorption stages and the plant comprises means such that the partially regenerated absorption medium withdrawn according to (e) is suppliable to an absorption stage upstream of the aforementioned absorption stage.

16. The plant according to claim 12, further comprising no means for hot regeneration of the laden absorption medium.

17. The plant according to claim 12, further comprising no means for providing a stripping auxiliary for use in the flash stages.

* * * * *